United States Patent [19]

Lueddecke et al.

[11] 4,279,789

[45] Jul. 21, 1981

[54] ACRYLIC COPOLYMERIC COATING COMPOSITION

[75] Inventors: Donald E. Lueddecke, St. Charles, Mo.; John J. Mottine, Jr., Red Bank Township, Monmouth County, N.J.; William C. Vesperman, Bel Air, Md.

[73] Assignees: Western Electric Company, Inc., New York, N.Y.; Bell Telephone Laboratories, Inc., Murray Hill, N.J.

[21] Appl. No.: 126,604

[22] Filed: Mar. 3, 1980

Related U.S. Application Data

[62] Division of Ser. No. 967,550, Dec. 7, 1978, Pat. No. 4,227,042.

[51] Int. Cl.³ .................................. C08L 1/14

[52] U.S. Cl. .................................. 260/17 R; 427/118; 428/379; 428/380; 428/383

[58] Field of Search .................................. 260/17 R

[56] References Cited

U.S. PATENT DOCUMENTS

| | | | |
|---|---|---|---|
| 1,982,831 | 12/1934 | Röhm et al. | 428/379 |
| 2,105,362 | 1/1938 | Nowak et al. | 428/379 |
| 3,477,969 | 11/1969 | Parker | 260/17 |
| 3,609,217 | 9/1971 | Gaja | 428/383 |
| 3,711,433 | 1/1973 | Willey | 260/17 |
| 3,758,428 | 9/1973 | Connelly et al. | 260/17 |
| 3,823,205 | 7/1974 | Zimmt | 260/901 |
| 3,900,435 | 8/1975 | Wingler et al. | 260/17 |
| 3,932,191 | 1/1976 | Jerabek et al. | 260/17 |
| 3,941,908 | 2/1976 | Valia et al. | 428/379 |
| 3,998,768 | 12/1976 | Pettit, Jr. | 260/17 |
| 4,020,216 | 4/1977 | Miller | 428/425 |
| 4,109,375 | 8/1978 | Lin et al. | 427/118 |
| 4,227,042 | 10/1980 | Lueddecke | 174/120 SR |

OTHER PUBLICATIONS

DuPont Elvacite Acrylic Resins–Properties and Uses.
"Eastman Cellulose Acetate Butyrate, CAB–381–0.5", Publication No. E180B.
Monsanto's Technical Bulletin–O/PL–350B, "Santicizer ®", 278.

*Primary Examiner*—Edward M. Woodberry
*Attorney, Agent, or Firm*—J. F. Spivak

[57] ABSTRACT

A polyvinyl chloride surface, such as plasticized polyvinyl chloride telephone cord jacket, is coated with a coating formulation comprising a medium molecular weight methyl methacrylate copolymer, cellulose acetate butyrate and a carbalkoxy benzyl phthalate plasticizer. The coating affords good adhesion, fast drying and stain resistance.

10 Claims, No Drawings

ACRYLIC COPOLYMERIC COATING COMPOSITION

This is a division of application Ser. No. 967,550 filed Dec. 7, 1978, now U.S. Pat. No. 4,227,042 issued Oct. 7, 1980.

TECHNICAL FIELD

This invention relates to telephone cords having a coated jacket and particularly to coated plasticized polyvinyl chloride jacketed telephone cords.

BACKGROUND OF THE INVENTION

Electrical wire insulated with plasticized polyvinyl chloride (PVC) is used widely for many applications including telephone cords such as those connecting telephone station equipment with wall or floor line junctions and for retractile telephone cords and telephone handsets. It is also used for electrical cords on consumer appliances. In these applications, the cords typically have high visibility coupled with high exposure to wear, staining and environmental degradation. With the increasing demand for cords that are coordinated in color with appliances or interior decor, the aesthetic appearance of the telephone cord is of ever increasing importance.

Notwithstanding the fact that previously used cords are often stained and discolored or have other aesthetic problems associated therewith, the cords nevertheless are suitable for reuse in an electrical sense in that electrical integrity and conductivity have not been affected. It has generally been found to be economical in the telephone industry to refurbish used telephone cords. In order for these telephone cords to be suitable for reinstallation with new phones or replacement equipment in the home or business, the cord must aesthetically appear new. Consequently, substantial quantities of recycled telephone cords must be painted or otherwise coated so as to give the telephone cord as aesthetically new appearance.

To be suitable for this purpose, any paint applied to the cords, must, especially in the case of retractile telephone cords, be flexible and resistant to cracking and peeling. It is also desirable to have a paint formulation which is relatively stain resistant, which can hold sufficient pigment to allow single coat coverage and which dries to a tack-free condition relatively quickly even in fairly humid conditions. Generally, to be suitable formulations should dry to a tack-free condition at relative humidities of 50% in not more than 20 minutes.

Previously, vinyl paint formulations were employed as coatings for the plasticized polyvinyl chloride jackets on telephone cords. These formulations tended to exhibit adhesion problems after a period of time. The adhesion problems were manifested by cracking and peeling of the coating. Furthermore, the stain resistance of the vinyl paints were relatively poor. More recently, the use of urethane paint became widespread for coating telephone cords. While the adhesion problem of the vinyl paints was substantially overcome with the newer urethane formulations, the urethane paint offered only minimal stain resistance. Moreover, processing problems such as reproducibility, the need for multiple coating, and long drying, times were encountered utilizing the urethane coating formulations.

Consequently, it would be extremely advantageous to employ a paint formulation which has good adhesion to the jacketed surface of the telephone cord and which can hold high pigment levels so as to allow one coat coverage while being relatively fast drying and stain resistant.

SUMMARY OF THE INVENTION

A polyvinyl chloride surface, such as a plasticized polyvinyl chloride telephone cord jacket, is coated, such as by dip coating or electrostatic coating, with a methyl methacrylic based coating formulation. The coating composition comprises (a) a resin binder comprising a medium molecular weight methyl methacrylate copolymer, (b) a cellulose acetate butyrate resin and (c) a carbalkoxy benzyl phthalate plasticizer. With respect to the aforementioned components, the solid copolymer is present in an amount of from 75 to 90 weight percent, the cellulose acetate butyrate resin from 5 to 15 weight percent and plasticizer from 5 to 10 weight percent. Optionally, the composition may include other components such as a viscosity reducing solvent, a bubble breaker, a slip agent, and pigments in the form of an opacifier and/or a colorant.

DETAILED DESCRIPTION OF THE INVENTION

While the present invention is described in terms of a paint for refurbishing or coating electrical cable such as telephone cords including retractile and multiconductive cords, it should be understood that the novel paint formulation may also be used for coating surfaces other than telephone cords or other electrical cable. As previously stated, since most telephone cords are jacketed with a highly plasticized polyvinyl chloride jacket, the novel paint formulation will be particularly suitable for coating any plasticized polyvinyl chloride surface.

It has been discovered that when coating a plasticized PVC jacketed telephone cord with a coating formulation comprising a binder comprising (a) 75 to 90 weight percent of a medium molecular weight methyl methacrylate copolymer, (b) 5 to 15 weight percent cellulose acetate butyrate resin and (c) 5 to 10 weight percent of a carbalkoxy benzyl phthalate plasticizer, and wherein the binder is dissolved in an aromatic based solvent, e.g., toluene or toluene-isopropanol mixture, unusual and unexpected synergistic results are obtained. These unexpected results were especially apparent at coating thicknesses of from about $\frac{3}{4}$ of a mil to $1\frac{1}{4}$ mils.

One of the unexpected results which were achieved was found when pigments were added to the novel formulation. Pigments are generally added to attain improved hiding power and for attaining desired colors for color coordination. It was thought to be the rule that as pigment concentration in a coating formulation is increased, adhesion to the substrate decreased. Unexpectedly, using the novel formulations of this invention, as pigment concentration was increased, up to about a pigment to binder weight ratio of about 1.6, the adhesion to the substrate also increased.

Another unexpected result relates to the stain resistance of the coating. Generally, upon adding a plasticizer to a resin coating formulation the resultant coating tends to lose stain resistant properties due to the combination of the stain with the plasticizer and migration of the stain containing plasticizer in the coating. Unexpectedly, stain resistance was not adversely effected by the inclusion of the carbalkoxy benzyl phthalate plasticizer of the novel coating formulation. The addition of plasticizer is necessary in order to insure the flexibility of the coating and prevent cracking of the coating when the telephone cords, such as retractile cords, are flexed.

Still another unexpected property of the novel coating formulation of this invention is its ability to dry, even in humid conditions of, for example, 50% or greater relative humidity. Generally, resins which have been plasticized to the extent required for retractile spring cords would be difficult to dry in humid conditions. The novel coating formulation, however, can be dried in relatively short periods of time at relative humidities as high as 85%. This property is important in the commercial processing of coated telephone cords and other materials. It is believed that the cellulose acetate butyrate resin in the formulation promotes drying.

Furthermore, the ability of the resin to be pigmented at high levels while maintaining and, in fact, increasing adhesion to the substrate allows for one coat coverage of the plasticized polyvinyl substrate resulting in a significant cost reduction where multiple coatings would otherwise be required.

In addition to the components of the primary binder composition set forth above, other additives may be included in the formulation. For example, one may add a solvent to reduce viscosity for handling of the primary binder-solvent system. The secondary solvent can for example be ethyl acetate. In addition a slip agent, such as a low molecular weight, non-contaminating silicone which is available as DC-11 silicone (5% solution) sold by Dow Corning may be included to reduce friction on the product after drying has occurred. Further, a bubble breaker to prevent the formation of, or break, the bubbles which may tend to otherwise form during the coating process may be included. An example of a suitable bubble breaker is polyvinyl isobutyl ether. This material is preferably added as a 5% solution in toluene. A variety of opacifiers and colorants may be added depending upon the color decided for the coating. For example, titanium dioxide may be added as an opacifier or whitener and aluminum pigment such as aluminum pigment 6571 available from Alcoa Company may be added to obtain a silver coloration. Other colorants or pigments may of course be added such as chromium oxide or other oxides or any of the other well known colorants or pigments used in the coating art. Similarly, secondary solvents, friction reducing agents and bubble breakers other than those cited above are suitable for use with the novel binder. Such materials are well known in the coating art.

The novel formulations may be applied to the substrate to be coated by various methods.

Applicable methods include, for example, dip coating, automatic electrostatic spray coating (low conductivity) or manual electrostatic spray coating (high conductivity). In each of these coating methods, a second solvent is added to the coating formulation which is appropriate to the specific method. Generally, solvent systems used in dip and electrostatic spray coating techniques are well known in the art and any of the prior art solvent systems which are compatible with a methyl methacrylate binder can be employed. Preferred solvent systems for dip and electrostatic spray coating of the novel formulations have been found. Generally, the primary constituents in these systems are alkyl acetates, e.g., isobutyl acetate. A preferred solvent system for dip coating is a one-to-one volume mixture of the basic coating formulation with isobutyl acetate solvent. The basic coating formulation, as used herein, means the binder, additives and solvent which make up the basic formulation which is then further diluted with a second solvent system. A preferred solvent system for automatic electrostatic spraying of the coating formulation is a one-to-three volume mixture of the basic coating formulation to a second solvent wherein the second solvent comprises by volume 30% methyl ethyl ketone, 68% isobutyl acetate, and 2% ethylene glycol monobutyl ether. A preferred solvent system for manual electrostatic spraying of the coating is also a one-to-three volume mixture of the basic coating formulation to a second solvent wherein the second solvent in this instance comprises, by volume, 2% butyl cellosolve (ethylene glycol monobutyl ether), 15% n-butanol, 35% isobutyl acetate, 5% cyclohexanone and 43% methyl ethyl ketone.

The preferred coating formulations comprise a binder comprising (a) 75–90 weight percent of a medium molecular weight copolymer of methyl methacrylate and 2-ethyl hexyl acrylate, (b) 5–15 weight percent cellulose acetate butyrate having a viscosity of from about 1.9 to 2.1 poise, an average butyryl content of about 37 weight percent and an average acetyl content of about 13 weight percent, and (c) 5–10 weight percent of a carbalkoxy benzyl phthalate plasticizer which is the condensation product of benzyl phthalate and the esters derived from the condensation of 2,2,4 trimethyl 1,3 pentanediol with isobutyric acid. Prior to mixing with the other components of the formulation, the methacrylate copolymer is preferably first dissolved in a toluene based solvent, e.g., one consisting of 80% toluene to 20% by weight isopropanol or other low molecular weight alcohol to give a solution representing 40% by weight of copolymer solids to 60% by weight of solvent. A preferred secondary solvent useful in preparing the basic formulation and further dissolving the binder is ethyl acetate. When the novel formulation is used to coat electrical conductors such as telephone cords, it is preferred to use an ethyl acetate solvent having a purity of at least about 99% such that the resistivity of the solvent is at least 20 megohms.

The novel formulation can be used to make a clear coating, in which event no pigment, i.e., opacifier or colorant, is added. Alternatively, if an opaque or colored coating is desired, opacifier and/or colorant is added to the basic formulation.

Since it is desirable for cost and ease of processing to be able to coat the telephone cords in a single coating operation the amount of opacifier or colorant used should at least be sufficient to achieve this goal. The actual amount to be used depends upon the particular opacifier or colorant and the nature and color of the telephone cord or base material to be coated. For example, if the colors of the plasticized polyvinyl chloride jacket and the coating to be applied thereto are the same, less pigment will probably be required than if coating a lighter color over a darker base material. The determination of the amount of pigment to be used is within the knowledge of those skilled in the art. Since adhesion has been found to increase with the amount of pigment added, up to a limit, it may be desirable to add more pigment than the minimum required for one coat coverage in order to increase adhesion. The optimum amount used for practical purposes, however, must be weighed based upon a cost factor as well as a performance factor since the cost increases with increasing amounts of additives. Furthermore, as the amount of pigment increases, the formulation tends to be thicker and handling and processing may become more difficult. Therefore the actual amounts of additives to be incorporated in the formulation to attain proper viscosity for ease of handling, one coat coverage, good adhesion and optimum cost factor is a variable which may easily be determined by one skilled in the art for the particular use of the formulation.

We have found that the replacement of any of the basic constituents in the binder of the novel formulation by materials similar to the constituents of the novel binder adversely affects the resultant formulation. This fact highlights the unexpected and synergistic results attained with the novel formulation. This observation can better be shown with reference to the comparative examples set forth below.

The coating formulation of each of the subsequent examples was coated on a highly plasticized polyvinyl chloride telephone cord jacket. The telephone cord was coated by dipping it into a dip coating formulation comprising a mixture of the coating formulation given in the respective examples mixed with a 1:1 volume ratio of isobutyl acetate. The time required for drying the coating was determined at 80 F. and 70% relative humidity. The specific test used to determine drying time involves drying a 12 foot telephone spring cord for a designated period of time and then applying a 2 pound compressive force on the spring cord helix for 5 minutes. The force is then removed and if the coils of the spring cord release within 8 seconds from removal of the force, the cord is considered dried and tack-free. The dried and tack-free cord may then be tested for adhesion of the coating on the polyvinyl chloride substrate. Adhesion is determined by a variation of adhesion test method 6301.1 found in *Federal Test Method Standards*, Vol. 141. This adhesion test involves placing an adhesive tape (Scotch Brand No. 600 or equivalent) over the surface to be tested and removing the tape after a period of time. The area of coating removed from the substrate upon removal of the tape is then determined. The greater the percent of surface area removed by the adhesive tape, the lower the actual adhesion. Percent adhesion, represents the ratio of surface area remaining divided by the total area tested for adhesion times 100.

EXAMPLE I

A. A preferred clear coating formulation consists of 633 grams of DuPont Elvacite 6014 methyl methacrylate copolymer in an aromatic solvent, 19.4 grams of Eastman CAB-381-0.5 cellulose acetate butyrate, 19.4 grams of Monsanto Santicizer 278, 245.3 grams ethyl acetate, 9.8 grams Dow Corning DC-11 silicone and 9.8 grams polyvinyl isobutyl ether. The Elvacite 6014 contains 40% by weight solids, or 253.2 grams of solid copolymer, in a solvent consisting of 80 parts toluene to 20 parts isopropanol. Another suitable available copolymer is DuPont's Elvacite 2014. This is available in bead form. The copolymer is a medium molecular weight methyl methacrylate copolymerized with ethyl hexyl acrylate. It has an acid number of 13 and a Knoop hardness number of 4.

The Eastman CAB 381-0.5 cellulose acetate butyrate has a viscosity of 1.9 to 2.1 poise, an average butyryl weight percent of about 37 weight percent and an average acetyl weight percent of about 13 weight percent. This material functions as a drying agent.

The Monsanto Santicizer 278 is a carbalkoxy benzyl phthalate plasticizer derived from the condensation of benzyl phthalate with the ester obtained from the condensation of isobutyric acid and 2,2,4 trimethyl 1,3 pentanediol.

The ethyl acetate solvent used in the formulation is at least 99% pure and has an electrical resistivity of at least 20 megohms. This solvent is added to reduce viscosity for handling purposes. The Dow Corning DC-11 silicone is a 5% silicone solution of a low molecular weight non-contaminating silicone which is added as a slip agent. The polyvinyl isobutyl ether is added as a 5% solution in toluene for the purpose of preventing the formation of bubbles. The total amount of binder in this formulation is therefore the sum of 253.2 grams of solid copolymer representing 86.8% of the binder, 19.4 grams of cellulose acetate butyrate representing 6.6 weight percent of the binder and 19.4 grams of the plasticizer representing 6.6 weight percent of the binder.

B. The coating formulation of this Example represents the preferred formulation for a satin silver coating on a plasticized polyvinyl chloride jacketed telephone cord. The formulation of this Example is identical to the formulation given in Example I-A except that the formulation includes 24.3 grams titanium dioxide opacifier and 39.0 grams of Alcoa 6571 aluminum pigment. The pigment to binder ratio in this formulation is therefore 63.3 grams pigment to 292 grams binder or 0.2:1.

C. The same formulation as set forth in Example I-A is used herein except that the formulation includes 370 grams titanium dioxide and 39 grams of the aluminum pigment giving a total pigment weight of 409 grams and a pigment to binder ratio of 1.4:1.

D. The coating formulation was prepared consisting of 657 grams of Elvacite 6014 copolymer resin (40% solids in toluene/isopropanol), 14.6 grams Eastman CAB-381-0.5 cellulose acetate butyrate, 14.6 grams Monsanto Santicizer 278, 245.3 grams ethyl acetate, 9.8 grams DC-11 silicone (5% solution), 9.8 grams polyvinyl isobutyl ether (5% in toluene), 24.3 grams titanium dioxide and 39 grams aluminum pigment. This formulation represents a binder consisting of 90% copolymer, 5% cellulose acetate butyrate and 5% plasticizer.

E. The formulation set forth in Example I-D is repeated except that 547.5 grams of Elvacite 6014 resin (40% solids in toluene/isopropanol), 43.8 grams of the cellulose acetate butyrate and 29.2 grams of the Santicizer 278 were employed. This formulation represents one wherein the binder consists of 75% copolymer, 15% CAB and 10% plasticizer.

EXAMPLE II

Examples II-A through II-E which are presented for comparative purposes are identical to the formulations set forth in Examples I-A through I-E, respectively, except that DuPont's Elvacite 2009 is substituted for the Elvacite 6014 resin of the novel formulations of Example I. DuPont's Elvacite 2009 is a medium molecular weight non-copolymerized methyl methacrylate polymer having an acid number of zero and a Tukon hardness Knoop number of 17.

EXAMPLE III

The formulations of Examples III-A through III-E which are also for comparative purposes are identical to those of Examples I-A through I-E, respectively, except that DuPont Elvacite 6028 is used in place of the DuPont Elvacite 6014 of the novel surface formulation. Elvacite 6028 is a low molecular weight methacrylate copolymer as opposed to the medium molecular weight methyl methacrylate copolymer of 6014.

The Table shown below summarizes the adhesion and drying times observed for coatings derived from formulations I-A through I-E, II-A through II-E and III-A through III-E.

| | Pig./ Binder Ratio | Wt. % CAB in Binder | % Adhesion | Drying Time (Minutes) |
|---|---|---|---|---|
| IA | 0 | 6.6 | 88. | 18 |
| IB | .2 | 6.6 | 89.5 | 16 |
| IC | 1.4 | 6.6 | 98 | 12 |
| ID | .2 | 5.0 | 91.8 | 20 |
| IE | .2 | 15.0 | 87.0 | 10 |
| IIA | 0 | 6.6 | 60 | 48 |
| IIB | .2 | 6.6 | 48 | 45 |
| IIC | 1.4 | 6.6 | 15 | 42 |
| IID | 0.2 | 5.0 | 50 | 50 |
| IIE | 0.2 | 15.0 | 43 | 30 |
| IIIA | 0 | 6.6 | 65 | 63 |
| IIIB | 0.2 | 6.6 | 60 | 59 |
| IIIC | 1.4 | 6.6 | 30 | 56 |
| IIID | 0.2 | 5.0 | 63 | 65 |
| IIIE | 0.2 | 15.0 | 53 | 45 |

One can readily see from the above Table that only the formulations exemplified by Examples I-A through I-E results in coatings having superior adhesion which increases with increasing pigment-to-binder ratio. Furthermore, it is also readily observable that only the novel formulations of Example I result in coatings having drying times of 20 minutes or less.

Similar experiments to the ones shown above have been performed wherein the plasticizer was butyl benzyl phthalate or dibenzyl phthalate or where other cellulose acetate butyrate resins having viscosities other than 1.9 to 2.1 were employed. In each of these instances, both adhesion and drying times were poorer than those observed in Examples I-A through I-E.

In addition to testing adhesion and drying times, clear coatings prepared in accordance with Examples I-A, II-A, and III-A were tested for stain resistance and compared. The stain indication employed was smoke permeation causing increased yellowness as the stain indicator. The coated telephone cord was exposed to smoke for a predetermined time and the cord was then measured on a Hunter D25D3 colorimeter with a reflectance attachment thereon in order to determine the increase in yellowness. It was found that coatings prepared in accordance with formulation I-A resulted in only a 20% yellowness increase while coatings prepared in accordance with formulations II-A and III-A resulted in yellowness increases of 48 and 52%, respectively.

What is claimed is:

1. A coating composition comprising a binder which comprises (a) 75–90 weight percent of a medium molecular weight methyl methacrylate and ethylhexyl acrylate copolymer, (b) 5–15 weight percent cellulose acetate butyrate having a viscosity of from about 1.9 to 2.1 poise and (c) 5–10 weight percent of a carbalkoxy benzyl phthalate lasticizer which is the condensation product of benzyl phthalate and the esters derived from the condensation of trimethylpentanediol with isobutyric acid.

2. The coating composition recited in claim 1 wherein said binder is dissolved in a solvent comprising toluene.

3. The coating composition recited in claim 2 said solvent further including ethyl acetate.

4. The coating composition recited in claim 3 wherein said ethyl acetate has a resistivity of at least 20 megohms.

5. The coating composition recited in claim 1 further including pigment in a pigment to binder weight ratio of less than 1.6:1.

6. The coating composition recited in claim 5 wherein said pigment to binder ratio is from 0.2 to 1.4.

7. The coating composition recited in claim 5 further including ethyl acetate and toluene.

8. The coating composition recited in claim 1 including pigment in a pigment to weight ratio of from 0.2 to 1.4, and solvents selected from toluene and ethyl acetate wherein said solvents are present in said coating composition in a weight percent of from about 40 to 60 weight percent.

9. The coating composition recited in claim 1 including polyvinyl isobutyl ether and a low molecular weight silicone.

10. The coating composition recited in claim 7 including polyvinyl isobutyl ether and a low molecular weight silicone slip agent.

* * * * *